(12) United States Patent
Itakura

(10) Patent No.: US 6,424,374 B2
(45) Date of Patent: *Jul. 23, 2002

(54) HUE ADJUSTING METHOD AND HUE ADJUSTING DEVICE

(75) Inventor: Hiroyuki Itakura, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/827,646

(22) Filed: Apr. 10, 1997

(30) Foreign Application Priority Data

Apr. 13, 1996 (JP) .............................................. 8-115411
Feb. 28, 1997 (JP) .............................................. 9-046667

(51) Int. Cl.⁷ ............................ H04N 9/64; H04N 5/228
(52) U.S. Cl. ...................... 348/222; 348/280; 348/651; 348/660; 358/520; 382/167
(58) Field of Search ................................ 348/222, 651, 348/223, 224, 228, 649, 650, 652, 655, 659, 660, 272, 273, 280; 382/167; 358/520; H04N 9/64, 9/67, 5/228, 3/14

(56) References Cited

U.S. PATENT DOCUMENTS

| 4,891,689 A | | 1/1990 | Senda et al. ................ 348/659 |
| 4,991,019 A | * | 2/1991 | Enami et al. ............... 348/721 |
| 5,333,070 A | * | 7/1994 | Ichikawa .................... 358/520 |
| 5,349,381 A | | 9/1994 | Murayama et al. ......... 348/252 |
| 6,058,208 A | * | 5/2000 | Ikeda et al. ................. 382/167 |

FOREIGN PATENT DOCUMENTS

JP          6-119455      *    4/1994     ........... G06F/15/72

* cited by examiner

Primary Examiner—Ngoc-Yen Vu
(74) Attorney, Agent, or Firm—Frommer Lawrence & Haug LLP; William S. Frommer; Bruno Polito

(57) ABSTRACT

An object of the invention is to provide a hue adjusting device and a hue adjusting method that adjust finely the hue of a color image signal. The CPU calculates an off set matrix B that is in a pair with an off set matrix A to a central matrix X when the matrix X and the off set matrix A are inputted from an operating part. Then the CPU carries out the following operation when a parameter a is inputted from the operating part.

$$X' = (a \cdot A + (1-a)B)/2$$

It is possible to execute matrix conversion to adjust the hue by setting a matrix coefficient of each component of the matrix X' the multiplication circuits.

8 Claims, 5 Drawing Sheets

HUE ADJUSTING METHOD AND HUE ADJUSTING DEVICE

BACKGROUND OF THE INVENTION

1. Field of the Invention

The present invention relates to a hue adjusting method for adjusting the hue by executing matrix conversion processing of a color signal and so on.

2. Description of the Related Art

At a processing part used for a camera device and so on, the hue is adjusted by executing matrix conversion to, for example, color signals of the three primary colors. Here, if the color signals of the three primary colors R, G and B, color signals R', G' and B', to which the matrix conversion is executed, and a matrix X are as follows:

$$P = \begin{pmatrix} R \\ G \\ B \end{pmatrix} Q = \begin{pmatrix} R' \\ G' \\ B' \end{pmatrix} X = \begin{pmatrix} 1 & s & t \\ u & 1 & v \\ w & x & 1 \end{pmatrix}$$

the matrix conversion is represented by an expression (1).

$$Q = X \cdot P \quad (1)$$

As the matrix X comprises six variable matrix coefficients of s, t, u, v, w and x and the color signals are related each other, when one matrix coefficient is changed, another matrix coefficients are also changed. Therefore, a user had to input six matrix coefficients every time when the hue was adjusted and it was inconvenient.

The present invention was performed considering said problems, and an object of the present invention is to provide a hue adjusting method and a hue adjusting device that are possible to adjust simply and easily the hue.

SUMMARY OF THE INVENTION

According to the present invention, a hue adjusting method, for adjusting the hue of a color image signal indicated by the three primary color signals, includes the steps of: inputting a central matrix coefficient deciding a central matrix X and that is the center of the variable range of a matrix coefficient; storing said central matrix coefficient; inputting a first matrix coefficient deciding a first matrix A and that is one end of the variable range of the matrix coefficient; storing said first matrix coefficient; inputting a parameter a for adjusting said central matrix coefficient; storing said parameter a; calculate X' by X'={a·A+(1−a)B}/2 when the second matrix B is B=2?X−A according to the stored central matrix coefficient, the first matrix coefficient and the parameter a; and setting X' as the coefficient of a matrix converting means for converting the hue of a color image signal indicated by said three primary color signals.

According to the present invention, a hue adjusting apparatus, for adjusting the hue of a color image signal indicated by three primary color signals, includes: a central matrix coefficient input means for inputting a central matrix coefficient deciding a central matrix X and that is the center of the variable range of a matrix coefficient; a central matrix coefficient storing means for storing said central matrix coefficient; a first matrix coefficient input means for inputting the first matrix coefficient deciding a first matrix A and that is one end of the variable range of the matrix coefficient; a first matrix coefficient storing means for storing said first matrix coefficient; a parameter input means for inputting a parameter a for adjusting said central matrix coefficient; a parameter storing means for storing said parameter a; a calculating means for calculating X' by X'={a·A+(1−a)B}/2 when the second matrix B is B=2·X−A according to the stored central matrix coefficient, the first matrix coefficient and the parameter a; a matrix converting means for converting the hue of a color image signal indicated by said three primary color signals; and a setting means for setting X' as a coefficient of huge conversion of said matrix means.

According to the present invention, a hue adjusting method, for adjusting the hue of a color image signal indicated by three primary color signals, includes the steps of: inputting first matrix coefficient deciding a first matrix A and that is an end of the variable range of a matrix coefficient; storing said first matrix coefficient; inputting a second matrix coefficient deciding a second matrix B and that is the other end of the variable range of the matrix coefficient; storing said second matrix coefficient; inputting a parameter a for adjusting said matrix coefficients between the matrix coefficients of said first matrix A and said second matrix B; storing said parameter a; calculating X' by X'={a·A+(1−a)B}/2 according to the stored first and second matrix coefficients and the parameter a; and setting X' as the coefficient of a matrix converting means for converting the hue of a color image signal indicated by said three primary color signals.

According to the present invention, a hue adjusting apparatus, for adjusting the hue of a color image signal indicated by three primary color signals, includes: a first matrix coefficient input means for inputting a first matrix coefficient deciding a first matrix A and that is an end of the variable range of a matrix coefficient; a first matrix coefficient storing means for storing said first matrix coefficient; a second matrix coefficient input means for inputting a second matrix coefficient deciding a second matrix B and that is the other end of the variable range of the matrix coefficient; a second matrix coefficient storing means for storing said second matrix coefficient; a parameter input means for inputting a parameter a for adjusting matrix coefficients between the matrix coefficients of said first matrix A and said second matrix B; a parameter storing means for storing said parameter a; a calculation means for calculating X' by X'={a·A+(1−a)B}/2 according to the stored first and second matrix coefficients and the parameter a; and a setting means for setting X' as a coefficient of a matrix converting means for converting the hue of a color image signal indicated by said three colors' signals.

DESCRIPTION OF THE PREFERRED EMBODIMENTS

An embodiment according to the present invention will be described referring to drawings.

A camera apparatus according to the present invention adjusts finely the hue by adjusting six matrix coefficients by a parameter when multiplying color signals obtained corresponding to image pick-up light of a subject by the six matrix coefficients.

Figure 1:
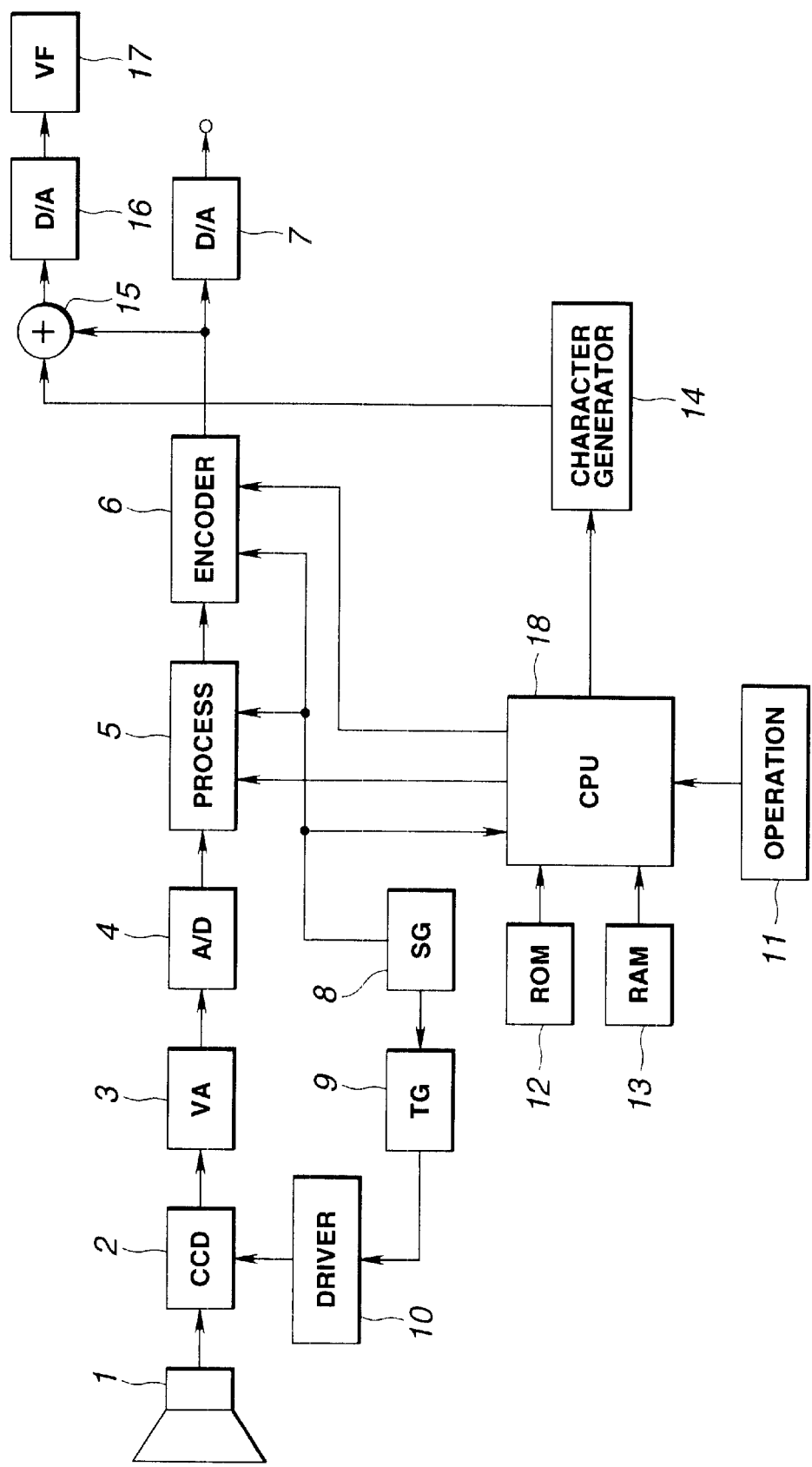
FIG. 1 is a block diagram showing the schematic structure of a camera apparatus according to the present invention.

Said camera apparatus includes, for example as shown in FIG. 1: a lens 1 gathering the image pick-up light of the subject; a CCD image sensor 2 outputting an image pick-up signal according to said image pick-up light; a video amplifier 3 for amplifying an image pick-up signal from the CCD image sensor 2, holding a sample, adjusting gain and so on; an A/D converter 4 for outputting image pick-up data by digitalizing the image pick-up signal from the video amplifier 3; a process circuit 5 for executing, that is, camera process to the image pick-up data from the A/D converter 4; and an encoder 6 for generating picture data of a standard TV system from the image pick-up data from the process circuit 5 and outputting it through a D/A converter 7.

The CCD image sensor 2 receives the image pick-up light from the subject through the lens 1, and supplies the image pick-up signal corresponding to the image pick-up light through the video amplifier 3, the A/D converter 4 to the process circuit 5. Here, said image-pick-up signal includes R (red), G (green) and B (blue) of color signals of the three primary colors, and the process circuit 5 performs the camera process of gamma correction, pedestal clamp, blanking inserting and so on to color signals R, G and B respectively. The color signals to which the camera process is executed are converted to, for example, image signals of the NTSC system and are outputted through the D/A converter 7.

Further, said camera apparatus includes a synchronous signal generating circuit 8 for generating a synchronous pulse, a timing generator 9 for generating a horizontal and a vertical synchronous signals according to the synchronous pulse from the synchronous signal generating circuit 8, and a driver 10 for driving the CCD image sensor 2 corresponding to the synchronous signal from the timing generator 9. The process circuit 5 and the encoder 6 actuates corresponding to the synchronous pulse from the synchronous signal generating circuit 8.

Further, said camera apparatus includes an operation part 11 for executing operation such as input of six matrix coefficients and so on, ROM (Read Only Memory) 12 in which programs such as a matrix operation has been stored in advance, RAM (Random Access Memory) 13 in which the inputted matrix coefficient and so on are temporarily stored, a character generator 14 for generating a character and so on for urging input instruction of the matrix coefficients, an image mixing circuit 15 for mixing the generated character with image data from the encoder, a view finder 17 for showing the image being taken and the character by supplying the image data from the image mixing circuit 15 through the a D/A converter 16, and the CPU (Central Processing Unit) 18 for controlling the whole camera apparatus.

The CPU 18 makes the character generator 14 generate the fixed character at the mode for adjusting the matrix coefficients and indicate the character on the view finder 17 through the image mixing circuit 15 and the D/A converter 16.

Figure 2:
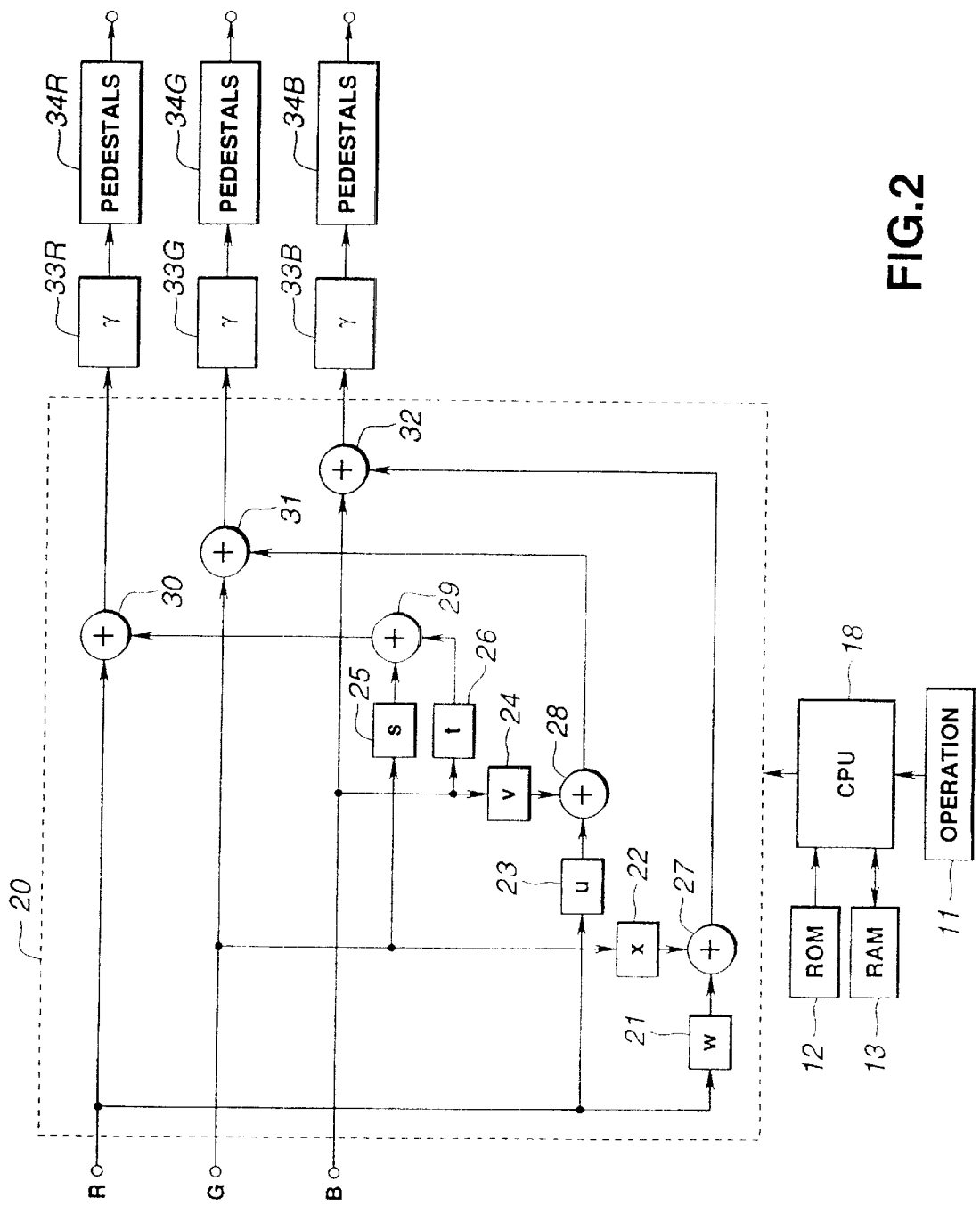
FIG. 2 is a block diagram showing the concrete structure of a process circuit of said camera apparatus.

Here, the process circuit includes, for example as shown in FIG. 2, a matrix circuit 20 for executing matrix conversion to the supplied color signals R, G and B and outputting the color signals R', G' and B', gamma correction circuits 33R, 33G and 33B for executing gamma correction to the color signals R', G' and B' from the matrix circuit 20 respectively, and pedestal circuits 34R, 34G and 34B for clamping the black levels of the color signals R', G' and B' from the gamma correction circuits 33R, 33G and 33B and for adding pedestal values.

The matrix circuit 20, as concretely shown in FIG. 2, is supplied with each of color signals R, G and B, and includes a multiplication circuit 21 for multiplying the color signal R by the matrix coefficient w, a multiplication circuit 22 for multiplying the color signal G by the matrix coefficient x, a multiplication circuit 23 for multiplying the color signal R by the matrix coefficient u, a multiplication circuit 24 for multiplying the color signal B by the matrix coefficient v, a multiplication circuit 25 for multiplying the color signal G by the matrix coefficient s, a multiplication circuit 26 for. multiplying the color signal B by the matrix coefficient t. In these multiplication circuits 21 through 26, it is possible to change setting of the matrix coefficients corresponding to control of the CPU 18.

Further, the matrix circuit 20 includes an addition circuit 27 for adding the color signals from the multiplication circuits 21 and 22, an addition circuit 28 for adding the color signals from the multiplication circuits 23 and 24, an addition circuit 29 for adding color signals from the multiplication circuits 25 and 26, an addition circuit 30 for adding the color signal R and the color signal from the addition circuit 29, an addition circuit 31 for adding the color signal G and the color signal from the addition circuit 28, and an addition circuit 32 for adding the color signal B and the color signal from the addition circuit 27.

Here, if vector comprising the color signals R, G and B is P, vector comprising the color signals R′, G′ and B′ is Q and the central matrix is X:

$$P = \begin{pmatrix} R \\ G \\ B \end{pmatrix} \quad Q = \begin{pmatrix} R' \\ G' \\ B' \end{pmatrix} \quad X = \begin{pmatrix} 1 & s & t \\ u & 1 & v \\ w & x & 1 \end{pmatrix}$$

relation between the color signals R, G and B and the color signals R', G' and B' which matrix conversion is executed is shown by an expression (1).

$$Q = X \cdot p \tag{1}$$

The camera apparatus constructed as above mentioned, is set to the matrix adjusting modes 1 and 2 corresponding to operation of the operating part 11.

At the matrix adjusting mode 1, an operator inputs central matrix coefficients of s, t, u, v, w and x which are the central values within the variable range of the matrix coefficients in the following fine adjustment and the matrix coefficients of s1, t1, u1, v1, w1 and x1 instead of inputting the matrix coefficient that is actually set actually. Still, the central matrix X is decided by deciding the central matrix coefficients s, t, u, v, w and x, and the matrix A is decided by inputting the matrix coefficients of s1, t1, u1, v1, w1 and x1.

Figure 3:
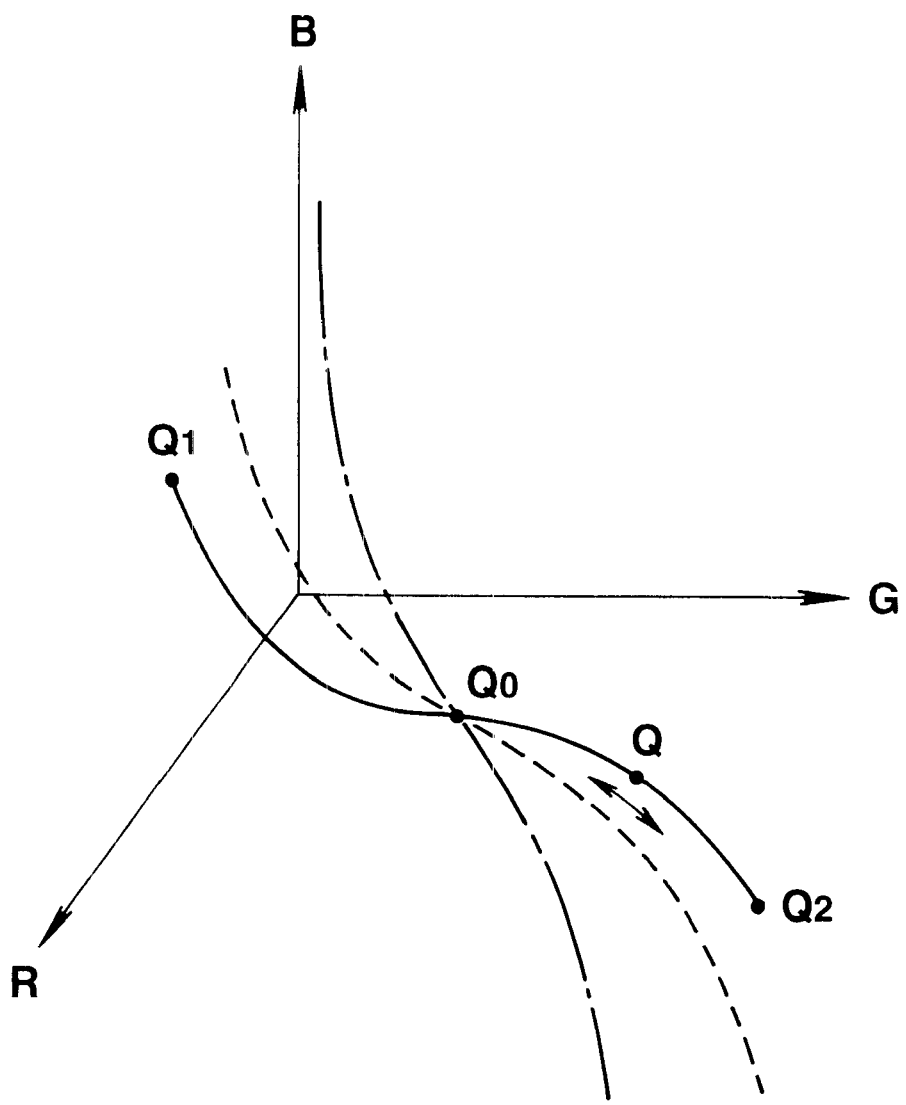
FIG. 3 is an explanatory view of the concept of adjusting the hue by using said camera apparatus.

The matrix coefficient which is actually set, as shown in FIG. 3, is adjustable between the matrixes B and A that are symmetrical as the central matrix X is the center.

Further, said camera apparatus, as shown in FIG. 3, is possible to move an arbitrary point Q of routs Q1 through Q2, to Q1 and Q2 which are obtained by substrating the matrixes A and B for the matrix X of the expression (1), thus being able to adjust finely the hue.

Figure 4:
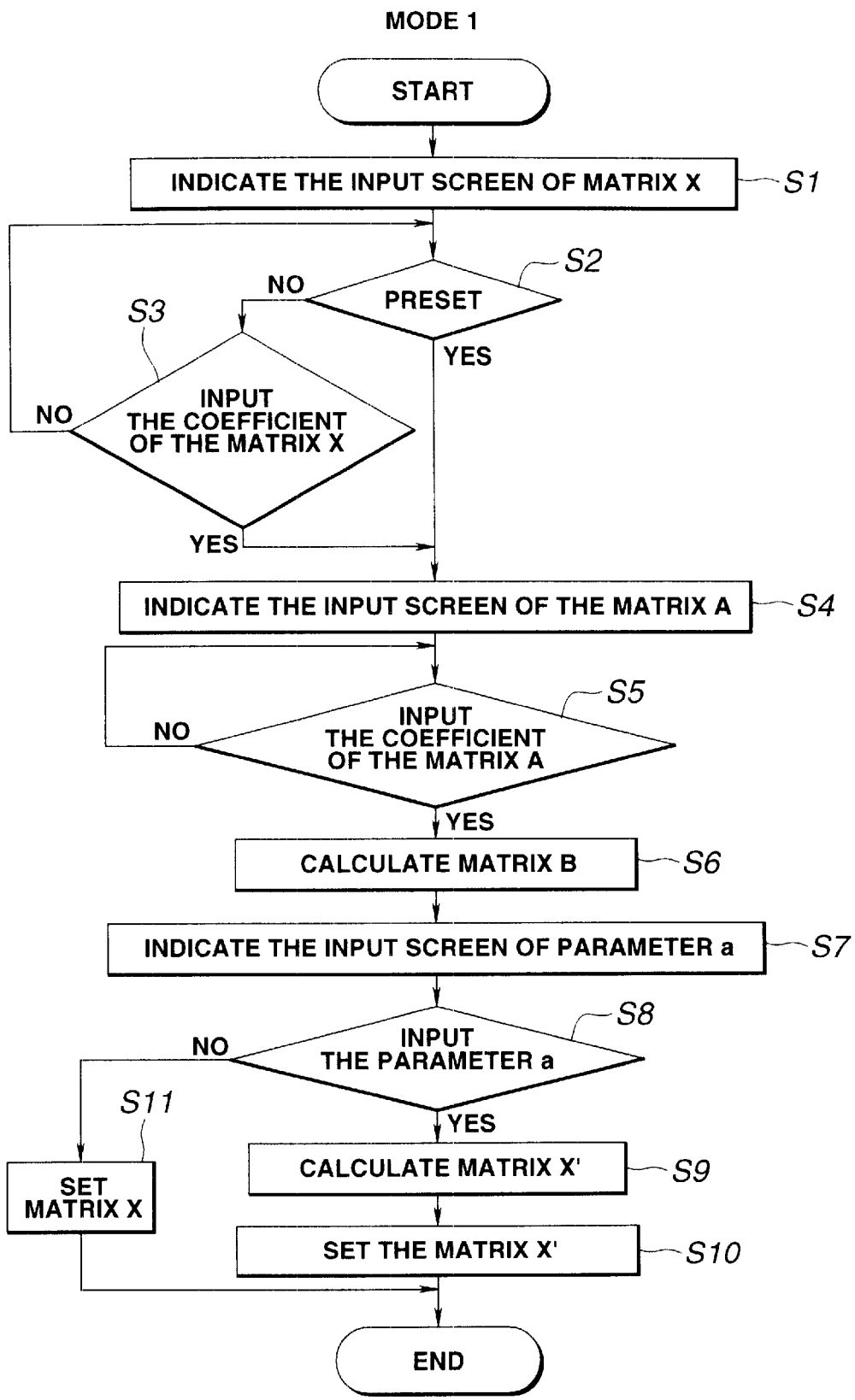
FIG. 4 is a flow chart for describing actuation of the first matrix adjusting mode of said camera apparatus.

As concretely shown in FIG. 4, after the CPU 18 is set to the mode 1, it proceeds to a step S1, makes the character generator 14 generate the character for urging the input of the central matrix X, supplies the character to the view finder 17 with the image data outputted from the encoder 6, and proceeds to a step S2. Then, for example, the image of the subject and "Central Matrix ?" at the corner are indicated in the view finder 17.

At a step S2, the CPU 18 detects whether instruction to choose the preset value that is set in advance is inputted or not, in case of being inputted, sets the matrix coefficient comprising the preset value, that is, stores into the RAM 13, and proceeds to a step S4. The preset value R is stored into the ROM 12 and the RAM 13 in advance. In case of not being inputted at the step S2, the CPU 18 proceeds to a step S3 and detects whether the coefficient of the matrix X is inputted or not. In case of being inputted, the CPU 18 proceeds to a step S4, and in case of not being inputted, returns to the step S2 and repeats this process.

At the step S4, the CPU 18 makes the character generator 14 generate the character for urging inputting of the off set matrix A, supplies the character to the view finder 17 with image data outputted from the encoder 6 and proceeds to a step S5. Then, for example, the image of the subject and "Central Matrix A ?" at the corner of it are indicated in the view finder 17.

At a step S5, the CPU 18 waits the off set matrix A to be inputted, when the off set matrix A is inputted, the CPU 18 stores the matrix coefficient into the RAM 13, and proceeds to the step S6.

At a step S6, the CPU 18 outputs the matrix coefficients of the central matrix X and the off set matrix from the RAM 13 one after another, calculates the off set matrix B that is a pair of the matrix A to the central matrix X and proceeds to a step S7.

Here, if the off set matrixes A and B are as follows:

$$A = \begin{pmatrix} 1 & s1 & t1 \\ u1 & 1 & v1 \\ w1 & x1 & 1 \end{pmatrix} B = \begin{pmatrix} 1 & s2 & t2 \\ u2 & 1 & v1 \\ w2 & x2 & 1 \end{pmatrix}$$

relation between the central X and the off set matrixes A and B is as follows:

$$X=(A+B)/2$$

That is, the relation between matrix coefficients of the matrix X, the off set matrix A and B, for example, the relation between s, s1 and s2 are as follows:

$$s = \frac{s1 + s2}{2}$$

Still, the relation between other matrix coefficients t, u, v, w, x and so on is similar.

Therefore, the CPU 18 calculates the off set matrix B by the expression (2).

$$B=2 \cdot X - A \qquad (2)$$

That is, the CPU 18 calculates the matrix coefficient of the off set matrix B by the following expression.

$$z2=2 \cdot z - z1$$

However, z=s, t, u, v, w and x

At the step S7, the CPU 18 makes the character generator 14 generate the character for urging inputting of a parameter a, supplies the character to the view finder 17 with image data outputted from the encoder 6 and proceeds to a step S8. Then, for example, the image of the subject and "Parameter a ?" at the corner of it are indicated in the view finder 17.

At a step S8, the CPU 18 detects whether the parameter a is inputted, or whether the instruction for setting the matrix coefficient is inputted, when the parameter a is inputted, the CPU 18 stores the value a into the RAM 13 and proceeds to a step S9 and when the instruction for setting the matrix coefficient is inputted, the CPU 18 proceeds to a step 11.

At a step S9, the CPU 18 outputs the matrix coefficients of the off set matrixes A and B and the parameter a from RAM 13 one after another, and calculates the matrix X' according to the off set matrixes A and B and the parameter a. And the CPU 18 stores the matrix coefficient of the matrix X' into the RAM 13 and proceeds a step 10.

Here, the CPU 18 calculates the matrix X' by an expression (3).

$$X'=\{a \cdot A+(1-a)B\}/2 \qquad (3)$$

That is, the CPU 18 calculates the matrix coefficient of the matrix X', for example s, by using the following expression. Still, other matrix coefficients t, u, v, w and x are similarly calculated.

$$s = \frac{s1 \times a + s2 \times (1-a)}{2}$$

At a step S10, the CPU 18 sets the matrix coefficient of the matrix X' as the matrix coefficient of each of multiplication circuits 21 through 26 of the matrix circuit 20. And at a step S11, the CPU 18 sets the matrix coefficient of the matrix X as the matrix coefficient of each of multiplication circuits 21 through 26 of the matrix circuit 20. S till, though finding the matrix B by operation at the step S6 in said example, it is possible that B expresses X and A as variables as clearly from the expression (2), so that X' may be found in the step (3) without finding the matrix B by operation.

Here, the embodiment will be described as follows. When the color signals R, G and B are supplied to the process circuit 5, in the matrix circuit 20, the matrix conversion is executed by the set matrix coefficient, and the color signals R, G and B are outputted through the gamma correction circuit 33 and the pedestal circuit 34.

That is, when said camera apparatus adjusts the hue, it is easily possible to adjust the hue by setting the central matrix X and the off set matrix A and by changing only the parameter a without inputting again all of six matrix coefficients in which the hue is changed with being related to each other. Said camera apparatus, as shown in FIG. 3, it is possible to adjust the hue by changing the routes Q1 through Q2 without changing the reference point Q0 determined by the central matrix X by changing the off set matrix A.

Next, the actuating state of the camera apparatus at the mode 2 will be described.

Said camera apparatus calculates the center matrix X when the off set matrixes A and B are inputted at the mode 2. Said camera device, as shown in FIG. 3, is possible to move an arbitrary point Q of the routes Q1 through Q2 by using a parameter to Q1 and Q2 which are obtained by substituting the matrixes A and B for the matrix X of the expression (1) and is possible to adjust finely the hue.

Figure 5:
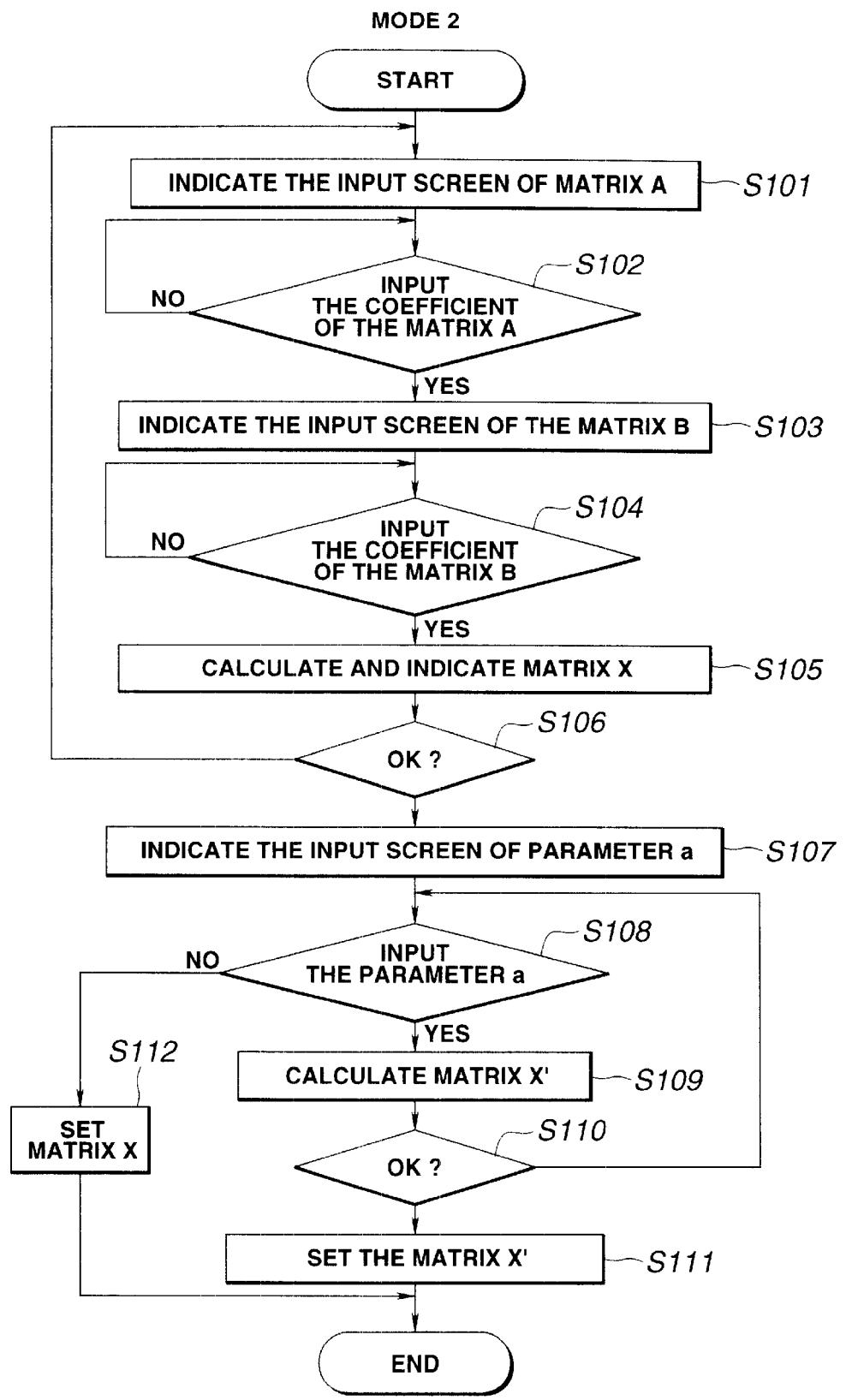
FIG. 5 is a flow chart for describing actuation of the second matrix adjusting mode of said camera apparatus.

Concretely to say, as shown in FIG. 5, the CPU 18 proceeds to a step S 101 when it is set to the mode 2, makes the character generator 14 generate the character for urging inputting of the off set matrix A, supplies the character to the view finder 17 with the image data outputted from the encoder 6, and proceeds to a step 102. Then, for example, the image of the subject and "Off Set Matrix A ?" at the corner of it are shown in the view finder 17.

At the step S102: the CPU 18 waits inputting of the off set matrix A; when the off set matrix A is inputted, the CPU 18 stores the matrix coefficient of it into the RAM 13 and proceeds to a step S103.

At the step 103, the CPU 18 makes the character generator 14 generate the character for urging inputting of the off set matrix B, supplies the character to the view finder 17 with the image data outputted from the encoder 6, and proceeds to a step 104. Then, for example, the image of the subject and "Off Set Matrix B ?" are shown in the view finder 17.

At the step S104, the CPU 18 waits inputting of the off set matrix B; when the off set matrix B is inputted, the CPU 18 stores the matrix coefficient of it into the RAM 13 and proceeds to a step S105.

At the step 105, the CPU 18 outputs the matrix coefficients of the off set matrixes A and B from the RAM 13 one after another and calculates the central matrix. That is, the CPU 18 makes the value that the sum of each matrix coefficient is divided by 2 to the off set matrixes A and B be the matrix coefficient of the central matrix. That is, the central matrix is found as follows.

$$X=(A+B)/2$$

That is, each matrix coefficient is found as follows.

$$z=(z1+z2)/2$$

Where t, u, v, w and x.

Further, the CPU 18 makes the character generator 14 generate the character of said matrix coefficient, indicates the character in the view finder 17 and proceeds to a step 106.

At the step 106: the CPU 18 detects whether a defined button (not shown) of the operating part 11 is pressed or not, and proceeds to a step 107 when pressed; when the decided button is not pressed and a reset button is pressed, the CPU 18 returns to the step S 101 and waits inputting of the off set matrix A again.

At the step 107, the CPU 18 makes the character generator 14 generate the character for urging inputting of the parameter a, supplies the character to the view finder 17 with the image data outputted from the encoder 6, and proceeds to a step 108. Then, for example, the image of the subject and "Parameter a ?" at the corner of it are shown in the view finder 17.

An a step S 108, the CPU 18 detects whether the parameter a is inputted, or whether the instruction of setting the matrix coefficient is inputted, when the parameter a is inputted, the CPU 18 stores the value of the parameter a into the RAM 13 and proceeds to a step S 109 and when the instruction of setting the matrix coefficient is inputted, the CPU 18 proceeds to a step 112.

At a step S 109, the CPU 18 outputs the matrix coefficients of the off set matrixes A and B and the parameter a from the RAM 13 one after another, and calculates the matrix X' according to the off set matrixes A and B and the parameter a, and proceeds to a step S 110. Here, the CPU 18 calculates the matrix coefficient of the matrix X' similarly to the step S 9.

At a step S 110, the CPU 18 sets the matrix coefficient of the matrix X' as the matrix coefficient of each of multiplication circuits 21 through 26 of the matrix circuit 20. And at a step S 112, the CPU 18 sets the matrix coefficient of the matrix X as the matrix coefficient of each of multiplication circuits 21 through 26 of the matrix circuit 20. When the color signals R, G and B are supplied to the process circuit 5, in the matrix circuit 20, the matrix conversion is executed by the set matrix coefficient, and the color signals R, G and B are outputted through the gamma correction circuit 33 and the pedestal circuit 34.

That is, every time when said camera apparatus adjusts the hue, it is easily possible to adjust the hue by setting the central matrix X and the off set matrix A and by changing only the parameter a without inputting again all of six matrix coefficients in which the hue is changed being related each other. Further, said camera apparatus is possible to input the off set matrixes A and B in which the predetermined off set is added to the central matrix X, therefore, it is possible to set the variable range of the matrix coefficient and to avoid executing adjustment of the hue that deviates from the original object.

Though the parameters a are inputted from the operating part 11 one by one according to the present embodiment, the present invention is not limited to this embodiment, for example, the parameters a may be continuously inputted by turning a dial and the hue may be adjusted while observing the image shown in the view finder 17.

As above mentioned, according to the present invention, if the matrix X and the off set matrix A have been set in advance without inputting any component of the matrix again every time when adjusting the hue, it is possible to adjust easily the hue by changing only the parameter a. Further, in said hue adjusting method, it is possible to change the range for adjusting the hue without changing the reference of the matrix conversion by changing the off set matrix A.

Further, in the hue adjusting method according to the present invention, if the off set matrixes A and B have been set in advance without inputting any component of the matrix again every time when adjusting the hue, it is possible to adjust easily the hue by changing only the parameter a. Further, according to said hue adjusting method, it is possible to input the off set matrixes A and B in which the fixed off set has added to the matrix X in advance, therefore, it is possible to set the range that the matrix conversion is executed in advance and possible to avoid adjusting the hue that deviates from the object of the present invention.

What is claimed is:

1. A hue adjusting method for adjusting the hue of a color image signal indicated by three primary color signals, said hue adjusting method comprising the steps of:

inputting a central matrix coefficient deciding a central matrix X and representing the center of the variable range of a matrix coefficients;

storing said central matrix coefficient;

inputting a first matrix coefficient deciding a first matrix A and representing one end of the variable range of the matrix coefficients;

storing said first matrix coefficient;

inputting a parameter "a" for adjusting said central matrix coefficient, and parameter being input in a continuously variable manner such that the value of the parameter may be continuously varied over a predetermined range;

storing said parameter "a";

calculating a matrix X' according to the equation $X'=\{a \cdot A+(1-a)B\}/2$ when the second matrix B is determined according tot he equation $B=2 \cdot X-A$; and converting the hue of a color image signal indicated by said three primary color signals by performing a matrix multiplication of X' and a vector representing values of said three primary color signals.

2. A hue adjusting method according to claim 1, wherein a step for inputting said central matrix coefficient comprises the step of indicating information for urging to input said central matrix coefficient on an indicating means.

3. A hue adjusting method according to claim 1, wherein a step for inputting said parameter comprises the step of;

indicating information for urging to input said parameter on an indicating means.

4. A hue adjusting apparatus for adjusting the hue of a color image signal indicated by three primary color signals, said hue adjusting apparatus comprising:

a central matrix coefficient input means for inputting a central matrix coefficient deciding a central matrix X and representing the center of a variable range of matrix coefficient;

a central matrix coefficient storing means for storing said central matrix coefficient;

a first matrix coefficient input means for inputting a first matrix coefficient deciding a first matrix A and representing one end of said variable range of matrix coefficient;

a first matrix coefficient storing means for storing said first matrix coefficient;

a parameter input means for inputting a parameter "a" for adjusting said central matrix coefficient, said parameter input means being a continuously variable input means such that the value of the parameter may be continuously varied over a predetermined range;

a parameter storing means for storing said parameter "a";

a calculating means for calculating X' according to the equation $X'=\{a \cdot A+(1-a)B\}/2$ when the second matrix B is determined according to the equation $B=2 \cdot X-A$;

a matrix converting means for converting the hue of a color image signal indicated by said three primary color signals by performing a matrix multiplication of X' and a vector representing values of said three primary colors.

5. A hue adjusting method for adjusting the hue of a color image signal indicated by three primary color signals, said hue adjusting method comprising the steps of:

inputting a first matrix coefficient deciding a first matrix A and representing one end of a variable range of a matrix coefficients;

storing said first matrix coefficient;

inputting a second matrix coefficient deciding a second matrix B and representing another end of said variable range of the matrix coefficients;

storing said second matrix coefficient;

inputting a parameter "a" for adjusting matrix coefficients between the matrix coefficients of said first matrix A and said second matrix B, said parameter being input in a continuously variable manner such that the value of the parameter may be continuously varied over a predetermined range;

storing said parameter "a";

calculating X' according to the equation $X'=\{a \cdot A+(1-a)B\}/2$ and stored first and second matrix coefficients and the parameter a; and converting the hue of a color image signal indicated by said three primary color signals by performing a matrix multiplication X' and a vector representing values of said three primary color signals.

6. The hue adjusting method according to claim 5, wherein a step for inputting said first matrix coefficient comprises the step of;

indicating information for urging to input said first matrix coefficient on an indicating means.

7. The hue adjusting method according to claim 5, wherein a step for inputting said parameter comprises the step of;

indicating information for urging to input said parameter on an indicating means.

8. A hue adjusting apparatus for adjusting the hue of a color image signal indicated by three primary color signals, said hue adjusting apparatus comprising:

a first matrix coefficient input means for inputting a first matrix coefficient deciding a first matrix A and representing one end a variable range of matrix coefficient;

a first matrix coefficient storing means for storing said first matrix coefficient;

a second matrix coefficient input means for inputting a second matrix coefficient deciding a second matrix B and representing another end of said variable range of matrix coefficients;

a second matrix coefficient storing means for storing said second matrix coefficient;

a parameter input means for inputting a parameter "a" for adjusting matrix coefficients between the matrix coefficients of said first matrix A and said second matrix B, said parameter input means being a continuously variable input means such that the value of the parameter may be continuously varied over a predetermined range;

a parameter storing means for storing said parameter "a";

a calculating means for calculating a matrix X' according to the equation $X'=\{a \cdot A+(1-a)B\}/2$; and a converting means for converting the hue of a color image signal indicated by said three primary color signals by performing a matrix multiplication X' and over a vector representing values of said three primary color signals.

* * * * *